United States Patent [19]

Sagawa et al.

[11] Patent Number: 5,350,789
[45] Date of Patent: Sep. 27, 1994

[54] HOT-MELT INK COMPOSITION

[75] Inventors: Akemi Sagawa; Ren Itoh; Masahiko Sakai; Riyuuichi Shimizu, all of Ibaraki, Japan

[73] Assignees: Hitachi Koki Co., Ltd.; Hitachi, Ltd., both of Tokyo, Japan

[21] Appl. No.: 7,783

[22] Filed: Jan. 22, 1993

[30] Foreign Application Priority Data

Jan. 23, 1992 [JP] Japan .................................. 4-009780
May 8, 1992 [JP] Japan .................................. 4-115722
Sep. 24, 1992 [JP] Japan .................................. 4-254557

[51] Int. Cl.⁵ ...................... C08L 91/00; C08L 23/00; C08K 5/20
[52] U.S. Cl. .................................. 524/313; 524/230; 524/226
[58] Field of Search ....................... 524/230, 226, 313; 106/27, 28

[56] References Cited

U.S. PATENT DOCUMENTS 4,749,736  6/1988  Khanna et al. ...................... 524/230
5,106,694  4/1992  Mizobuchi et al. .................. 428/447
5,122,187  6/1992  Schwarz et al. ...................... 106/25

Primary Examiner—Paul R. Michl
Assistant Examiner—LaVonda R. DeWitt
Attorney, Agent, or Firm—Sughrue, Mion, Zinn, Macpeak & Seas

[57] ABSTRACT

A hot-melt ink composition for an ink jet printer comprising from 10 to 65% by weight of a polyamide resin, from 5 to 60% by weight of a fatty acid amide, from 5 to 40% by weight of a glyceride, and up to 5% by weight of a colorant. The composition is excellent in transparency to provide a highly transparent ink image on an OHP sheet.

29 Claims, No Drawings

HOT-MELT INK COMPOSITION

FIELD OF THE INVENTION

This invention relates to a hot-melt ink composition particularly for an ink jet printer.

BACKGROUND OF THE INVENTION

Water-soluble liquid ink compositions have widely been employed in ink jet recording systems, but their use is limited to printing on special paper with a non-blotting coat due to their easy soaking through usual paper. Where the water-soluble liquid ink compositions are applied to OHP (overhead projector) sheets, the poor drying properties have made it necessary to give a special pretreatment to the sheet surface.

Under these circumstances, a hot-melt ink jet recording system has been proposed, which affords satisfactory print quality irrespective of the kind of paper. According to this system, a hot-melt ink composition mainly comprising a wax, etc. which is solid at room temperature is liquefied by heating, imagewise jetted onto paper by means of any energy, and cooled and solidified on the paper to form a dot image.

The hot-melt ink jet recording system has various advantages over the aqueous ink jet recording system in that the ink, as being solid at room temperature, causes no stains on handling; that evaporation of the ink in the molten state can be minimized, causing no clogging of a nozzle; and that the molten ink is rapidly solidified and dried immediately after being jetted, causing no blots on paper, so that various sorts of paper, such as Japanese paper, drawing paper, post cards, etc., may be used without requiring any pretreatment.

Comprising a wax as a main component, the conventional hot-melt inks have low transparency on an OHP sheet. In order to improve transparency, it has been proposed to smooth the surface of the ink image fixed on an OHP sheet by means of a hot roller to thereby prevent scattering of light. However, such a post treatment is still insufficient for obtaining desired transparency.

Thus, while the hot-melt ink jet recording system is expected to be applied to office automation equipment, printers for domestic use, facsimiles, etc. on account of its advantages over the aqueous ink jet recording system as mentioned above, the poor transparency of the hot-melt ink on an OHP sheet has been a hindrance to putting it to practical use.

SUMMARY OF THE INVENTION

An object of the present invention is to provide a hot-melt ink composition for ink jet recording which provides an ink image having improved transparency without requiring any post treatment, such as rolling.

The above object of the present invention is accomplished by a hot-melt ink composition which is solid at room temperature and is liquefied by heating, comprising from (a) 10 to 65% by weight of a polyamide resin, at least one of (b) from 5 to 60% by weight of a fatty acid amide and (c) from 5 to 40% by weight of a glyceride, and, if desired, (d) not more than 5% by weight of a colorant.

The added amount of the polyamide resin is preferably from 10 to 20% by weight, more preferably 10% by weight. The added amount of the fatty acid amide is preferably from 40 to 60% by weight, more preferably 50% by weight. The added amount of glyceride is preferably from 10 to 40% by weight, more preferably 10% by weight. The added amount of the colorant is preferably from 0.5 to 5% by weight.

The hot-melt ink composition of the present invention embraces the following three preferred embodiments:

(A) A hot-melt ink composition comprising (a) from 25 to 65% by weight of a polyamide resin, from 5 to 30% by weight of (b) a fatty acid amide or (b') a triglyceride, (e) not more than 25% by weight of a wax, and (d) from 0.5 to 5% by weight of a colorant.

(B) A hot-melt ink composition comprising (a) from 25 to 65% by weight of a polyamide resin, (b) from 10 to 60% by weight of a fatty acid amide, and (d) from 0.5 to 5% by weight of a colorant. It is preferable that the composition further comprises (f) not more than 40% by weight of a fatty acid.

(C) A hot-melt ink composition comprising (a) from 10 to 50% by weight of a polyamide resin, (b) from 20 to 60% by weight of a fatty acid amide, (c) from 10 to 40% by weight of a glyceride, and (d) from 0.5 to 5% by weight of a colorant.

DETAILED DESCRIPTION OF THE INVENTION

The polyamide resin as component (a) of the ink composition according to the present invention is at least one of aromatic polyamides and dimeric acid polyamides, which provides an ink having excellent transparency. The viscosity of the polyamide resin itself is preferably from 100 to 500 mPa.S at 130° C. The amine value of the polyamide resin is preferably from 1.0 to 5.0 KOH mg/g.

The fatty acid amide as component (b) is effective to drop the melting point of the ink and to drop the viscosity of the ink in a molten state. The fatty acid amide includes saturated or unsaturated fatty acid amides. Specific examples of suitable fatty acid amides include N-unsubstituted fatty acid amides, such as lauramide, stearamide, oleamide, erucamide, ricinoleic acid amide, 1,2-hydroxystearamide, palmitamide, behenamide, and brassidamide; and N-substituted fatty acid amides, such as N,N'-ethylenebisoleic acid amide, N,N'-xylenebisstearic acid amide, stearic acid monomethylolamide, N-oleylstearic acid amide, N-stearylstearic acid amide, N-oleylpalmitic acid amide, N-stearylerucic acid amide, N,N'-dioleyladipic acid amide, N,N'-dioleylsebacic acid amide, and N,N'-distearylisophthalic acid amide. These fatty acid amides may be used either individually or in combination of two or more thereof.

Examples of the triglyceride as component (b') include castor oil comprising the following compound as the main component.

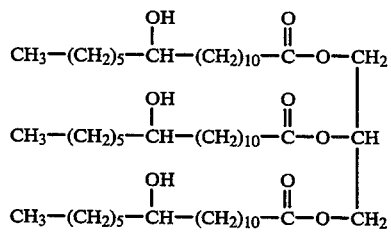

Examples of the glyceride as component (c), which include triglyceride, include hardened castor oil, partially hydrogenated castor oil, extremely hardened soybean oil, extremely hardened rape seed oil, extremely hardened vegetable oils, etc. and mixtures thereof.

The colorant as component (d) preferably includes solvent dyes in view of their solubility and excellent thermal stability. Any kind of dyes may be used as long as it is compatible with other ink components. Specific examples of suitable dyes are shown below.

Magenta Dyes

MS Magenta VP, MS Magenta HM-1450, and MS Magenta HSo-147 (all produced by Mitsui Toatsu Chemicals Inc.); AIZEN SOT Red-1, AIZEN SOT Red-2, AIZEN SOT Red-3, AIZEN SOT Pink-1, and SPIRON Red GEH SEPCIAL (all produced by Hodogaya Chemical Co., Ltd.); RESOLIN Red FB 200%, MACROLEX Red Violet R, and MACROLEX ROT 5B (all produced by Bayer Japan); KAYASET Red B, KAYASET Red 130, and KAYASET Red 802 (all produced by Nippon Kayaku Co., Ltd.); PHLOXIN, ROSE BENGAL, and ACID Red (all produced by Daiwa Kasei K.K.); HSR-31 and DIARESIN Red K (both produced by Mitsubishi Kasei Corporation); and Oil Red (produced by BASF Japan).

Cyan Dyes

MS Cyan HM-1238, MS Cyan HSo-16, Cyan HSO-144, and MS Cyan VPG (all produced by Mitsui Toatsu Chemicals Inc.); AIZEN SOT Blue-4 (produced by Hodogaya Chemical Co., Ltd.); RESOLIN BR, Blue BGLN 200%, MACROLEX Blue RR, CERES Blue GN, SIRIUS SUPRATURQ. Blue Z-BGL, and SIRIUS SUPRA TURQ. Blue FB-LL 330% (all produced by Bayer Japan); KAYASET Blue FR, KAYASET Blue N, KAYASET Blue 814, Turq. Blue GL-5 200, and Light Blue BGL-5 200 (all produced by Nippon Kayaku Co., Ltd.); DAIWA Blue 7000 and Oleosol Fast Blue GL (both produced by Daiwa Kasei K.K.); DIARESIN Blue P (produced by Mitsubishi Kasei Corporation); and SUDAN Blue 670, NEOPEN Blue 808, and ZAPON Blue 806 (all produced by BASF Japan).

Yellow Dyes

MS Yellow HSm-41, Yellow KX-7, and Yellow EX-27 (all produced by Mitsui Toatsu Chemicals, Inc.); AIZEN SOT Yellow-1, AIZEN SOT Yellow-3, and AIZEN SOT Yellow-6 (all produced by Hodogaya Chemical Co., Ltd.); MACROLEX Yellow 6G, MACROLEX FLUOR, and Yellow 10GN (all produced by Bayer Japan); KAYASET Yellow SF-G, KAYASET Yellow 2G, KAYASET Yellow A-G, and KAYASET Yellow E-G (all produced by Nippon Kayaku Co., Ltd.); DAIWA Yellow 330HB (produced by Daiwa Kasei K.K.); HSY-68 (produced by Mitsubishi Kasei Corporation); and SUDAN Yellow 146 and NEOPEN Yellow 075 (both produced by BASF Japan).

Black Dyes

MS Black VPC (produced by Mitsui Toatsu Chemicals, Inc. ); AIZEN SOT Black-1 and AIZEN SOT Black-5 (both produced by Hodogaya Chemical Co., Ltd. ): RESORIN Black GSN 200% and RESOLIN Black BS (both produced by Bayer Japan); KAYASET Black A-N (produced by Nippon Kayaku Co., Ltd. ); DAIWA Black MSC (produced by Daiwa Kasei K.K. ); HSB-202 (produced by Mitsubishi Kasei Corporation); and NEPTUNE Black X60 and NEOPEN Black X58 (both produced by BASF Japan).

These colorants may be used either individually or in combination of two or more thereof to obtain any desired tone.

The wax as component (e) includes paraffin wax selected from petroleum waxes, carnauba wax, and montan wax. From the standpoint of dye dissolving power, the melting point, and stability, microcrystalline wax, montan wax, and derivatives thereof are preferred.

The fatty acid as component (f) includes stearic acid, arachic acid, behenic acid, lignoceric acid, cerotic acid, montanic acid, and melissic acid. From the viewpoint of dye dissolving power, the melting point, and hardness, stearic acid and behenic acid are preferred.

The amounts of the above-mentioned components in the hot-melt ink compositions according to the present invention will be described below with reference to particular embodiments (A) to (C).

The hot-melt ink composition (A) according to the first embodiment of the present invention (hereinafter referred to as composition (A)) contains the polyamide resin (a) in an amount of from 25 to 65% by weight, and preferably 58.8% by weight. If the amount of the polyamide resin exceeds 65% by weight, the ink composition will have too a high viscosity to be jetted easily through a nozzle. If it is less than 25% by weight, effect of polyamide is liable to be reduced.

The fatty acid amide (b) is present in composition (A) in an amount of from 5 to 30% by weight, and preferably 19.6% by weight. If its amount exceeds 30% by weight, the transparency of the ink composition is liable to be reduced. If it is less than 5% by weight, the function of dropping the viscosity is no more performed. A part or the whole of the fatty acid amide may be replaced with a triglyceride for the same purpose.

The colorant (d) is present in composition (A) in an amount of from 0.5 to 5% by weight, and preferably from 1 to 3% by weight. If its amount is less than 0.5% by weight, the image quality is reduced.

If desired, composition (A) may further contain up to 25% by weight, and preferably 19.6% by weight, of the wax (e). Addition of more than 25% of the wax results in a reduction of transparency of the ink. No wax is necessary where the colorant used is satisfactorily soluble in other components and the composition has a satisfactory melting point and satisfactory stability.

The hot-melt ink composition according to the second embodiment of the present invention (hereinafter referred to as composition (B)) contains the polyamide resin (a) in an amount of from 25 to 65% by weight, and preferably not more than 50% by weight. If the amount of the polyamide resin exceeds 65% by weight, the ink composition will have too high a viscosity to be jetted easily through a nozzle. If it is less than 25% by weight, the effect of the polyamide is liable to be reduced.

The fatty acid amide (b) is present in composition (B) in an amount of from 10 to 60% by weight, and preferably 33% by weight. If its amount exceeds 60% by weight, the transparency of the ink composition will be reduced. If it is less than 10% by weight, the function of dropping the viscosity is liable to be reduced.

The colorant (d) is present in composition (B) in an amount of from 0.5 to 5% by weight.

If desired, composition (B) may further contain up to 40% by weight, and preferably 15% by weight, of the fatty acid (f). Addition of more than 40% of the fatty acid (f) results in a reduction of transparency of the ink. No fatty acid is necessary where the colorant used is satisfactorily soluble in other components and the composition has a satisfactory melting point and satisfactory hardness.

The hot-melt ink composition according to the third embodiment of the present invention (hereinafter referred to as composition (C)) contains the polyamide resin (a) in an amount of from 10 to 50% by weight, and preferably not more than 20% by weight. If the amount of the polyamide resin exceeds 50% by weight, the ink composition is liable to have too a high viscosity to be jetted easily through a nozzle. If it is less than 10% by weight, the effect of polyamide is not effective.

The fatty acid amide (b) is present in composition (C) in an amount of from 20 to 60% by weight, and preferably not more than 58% by weight. If its amount exceeds 60% by weight, the hardness of the ink composition will be reduced. If it is less than 20% by weight, the function of dropping the viscosity is liable to be reduced.

The glyceride (c) is present in composition (C) in an amount of from 10 to 40% by weight, and preferably not more than 20% by weight. If its amount exceeds 40% by weight, the adhesion of the ink composition to paper or OHP sheets is reduced. If it is less than 10% by weight, the effect of the glyceride may be reduced.

The colorant (d) is present in composition (C) in an amount of from 0.5 to 5% by weight.

If desired, the ink composition according to the present invention may further contain various additives for imparting desired functions as long as the advantages of the present invention are not impaired. Such additives include surface treating agents, surface active agents, viscosity depressants, antioxidants, preservatives, and the like.

The hot-melt ink composition of the present invention having the above-mentioned construction exhibits greatly improved transparency or light transmittance properties and therefore makes it possible to form a transparent ink image on an OHP sheet.

The present invention is now illustrated in greater detail with reference to Examples, but it should be understood that the present invention is not construed as being limited thereto. All the percents are by weight unless otherwise indicated.

Materials used in Examples were as follows.

Polyamide

A-1: "Tohmide TXD-101" produced by Fuji Kasei Co., Ltd.
A-2: "Tohmide 92" produced by Fuji Kasei Co., Ltd.
A-3: "Tohmide 90" produced by Fuji Kasei Co., Ltd.
A-4: "Versamid 335" produced by Henkel Japan Co., Ltd.
A-5: "Versamid 759" produced by Henkel Japan Co., Ltd.

Viscosity Depressant

"Exceparl HD-PB" produced by Kao Corporation.

Fatty Acid Amide

F-1: Stearamide produced by Wako Pure Chemical Industries, Ltd.
F-2: Lauramide produced by Wako Pure Chemical Industries, Ltd.
F-3: Oleamide produced by Wako Pure Chemical Industries, Ltd.
F-4: "Fatty Acid Amide ON" produced by Kao Corporation
F-5: "Fatty Acid Amide S" produced by Kao Corporation Glyceride G-1: "Panacete 1000", a triglyceride produced by Nippon Oil & Fats Co., Ltd.
G-2: "RH-60" produced by Kawaken Fine Chemicals, Ltd.
G-3: "RH-60P" produced by Kawaken Fine Chemicals, Ltd.
G-4: "K-3 Wax" produced by Kawaken Fine Chemicals, Ltd.

Wax

W-1: "Hoechst Wax S", montan wax produced by Hoechst Japan
W-2: "Hoechst Wax E" produced by Hoechst Japan
W-3: "NPS-6010" produced by Nippon Seiro Co., Ltd.

Fatty Acid

C-1: Stearic acid produced by Wako Pure Chemical Industries, Ltd.

Dye

M: "AIZEN SOT Pink-1", a magenta dye produced by Hodogaya Chemical Co., Ltd.
C: "Oleosol Fast Blue GL", a cyan dye produced by Daiwa Chemical
Y: "NEOPEN Yellow 075", a yellow dye produced by BASF Japan
Bk: "RESOLIN Black BS", a black produced by Bayer Japan

EXAMPLE 1

A mixture comprising 58.8% of Polyamide A-1, 19.6% of Fatty acid amide F-1, 19.6% of Wax W-1, and 2.0% of Dye M was heated at 120°±10° C. until the mixture turned to a homogeneous molten mixture (for about 2 hours). After removing impurities, etc. by filtration under heat and pressure, the molten mixture was allowed to cool at room temperature to obtain a homogeneous hot-melt magenta ink.

The resulting ink was heated and was manually applied, while being molten, to a transparent OHP sheet ("Star" produced by Sakurai) to form an ink film having a thickness of from about 15 to 30 μm. The ink-coated OHP sheet was cut to 50 mm long and 15 mm wide strips. A transmittance of the strip was measured with a spectrophotometer ("Model 330" manufactured by Hitachi, Ltd.). Transparency of the strip was observed with the naked eye to light of OHP ("Model M-4000" manufactured by 3M). In order to evaluate adhesion of the ink film, the strip was wound around a ⅛ in. mandrel, and the ink film was rubbed twice at room temperature to see the degree of peeling. The results obtained are shown in Table 1 below. It is seen that the ink composition exhibits high transmittance, excellent transparency, and excellent adhesion.

EXAMPLE 2

A hot-melt magenta ink composition was prepared in the same manner as in Example 1, except for replacing Fatty acid amide F-1 with F-2, and evaluated in the same manner as in Example 1. The results obtained are shown in Table 1 below. It is seen that the ink composition exhibits high transmittance, excellent transparency, and excellent adhesion similarly to Example 1.

EXAMPLE 3

A hot-melt ink composition was prepared in the same manner as in Example 1, except for replacing Fatty acid amide F-1 with F-3, and evaluated in the same manner as in Example 1. The results obtained are shown in Table 1 below. It is seen that the ink composition exhibits high transmittance, excellent transparency, and excellent adhesion similarly to Example 1.

EXAMPLE 4

A cyan hot-melt ink composition was prepared in the same manner as in Example 1, except for replacing Fatty acid amide F-1 with F-3 and replacing Dye M with C, and evaluated in the same manner as in Example 1. The results obtained are shown in Table 1 below. It is seen that the ink composition exhibits high transmittance, excellent transparency, and excellent adhesion similarly to Example 1.

EXAMPLE 5

A yellow hot-melt ink composition was prepared in the same manner as in Example 1, except for replacing Fatty acid amide F-1 with F-3 and replacing Dye M with Y, and evaluated in the same manner as in Example 1. The results obtained are shown in Table 1 below. It is seen that the ink composition exhibits high transmittance, excellent transparency, and excellent adhesion similarly to Example 1.

EXAMPLE 6

A black hot-melt ink composition was prepared in the same manner as in Example 1, except for replacing Fatty acid amide F-1 with F-3 and replacing Dye M with Bk, and evaluated in the same manner as in Example 1. The results obtained are shown in Table 1 below. It is seen that the ink composition exhibits high transmittance, excellent transparency, and excellent adhesion similarly to Example 1.

EXAMPLE 7

A magenta hot-melt ink composition was prepared in the same manner as in Example 1, except for replacing Polyamide A-1 with A-2, and evaluated in the same manner as in Example 1. The results obtained are shown in Table 1 below. It is seen that the ink composition exhibits high transmittance, excellent transparency, and excellent adhesion similarly to Example 1.

EXAMPLE 8

A magenta hot-melt ink composition was prepared in the same manner as in Example 2, except for replacing Polyamide A-1 with A-2, and evaluated in the same manner as in Example 1. The results obtained are shown in Table 1 below. It is seen that the ink composition exhibits high transmittance, excellent transparency, and excellent adhesion similarly to Example 2.

EXAMPLE 9

A magenta hot-melt ink composition was prepared in the same manner as in Example 3, except for replacing Polyamide A-1 with A-2, and evaluated in the same manner as in Example 1. The results obtained are shown in Table 1 below. It is seen that the ink composition exhibits high transmittance, excellent transparency, and excellent adhesion similarly to Example 3.

EXAMPLE 10

A magenta hot-melt ink composition was prepared in the same manner as in Example 7, except that the amounts of F-1 and W-1 were changed to 25% and 14.2%, respectively, and evaluated in the same manner as in Example 1. The results obtained are shown in Table 1 below. It is seen that the ink composition is inferior to that of Example 7 in transmittance and transparency.

EXAMPLE 11

A magenta hot-melt ink composition was prepared in the same manner as in Example 7, except that the amounts of F-1 and W-1 were changed to 14.2% and 25%, respectively, and evaluated in the same manner as in Example 1. The results obtained are shown in Table 1. It is seen that the ink composition inferior is to that of Example 7 in transmittance and transparency.

EXAMPLE 12

A magenta hot-melt ink composition was prepared in the same manner as in Example 1, except for replacing Polyamide A-1 with A-3, and evaluated in the same manner as in Example 1. The results obtained are shown in Table 1. It is seen that the ink composition exhibits high transmittance, excellent transparency, and excellent adhesion similarly to Example 1.

EXAMPLE 13

A magenta hot-melt ink composition was prepared in the same manner as in Example 2, except for replacing Polyamide A-1 with A-3 and replacing Wax W-1 with W-2, and evaluated in the same manner as in Example 1. The results obtained are shown in Table 1. It is seen that the ink composition exhibits high transmittance, excellent transparency, and excellent adhesion similarly to Example 2.

EXAMPLE 14

A magenta hot-melt ink composition was prepared in the same manner as in Example 3, except for replacing Polyamide A-1 with A-4 and replacing Wax W-1 with W-3, and evaluated in the same manner as in Example 1. The results obtained are shown in Table 1. It is seen that the ink composition exhibits high transmittance, excellent transparency, and excellent adhesion similarly to Example 3.

EXAMPLE 15

A magenta hot-melt ink composition was prepared in the same manner as in Example 1, except for replacing Fatty acid amide F-1 with Triglyceride G-1, and evaluated in the same manner as in Example 1. The results obtained are shown in Table 1. It is seen that the ink composition exhibits high transmittance, excellent transparency, and excellent adhesion similarly to Example 1.

EXAMPLE 16

A magenta hot-melt ink composition was prepared in the same manner as in Example 7, except for replacing Fatty acid amide F-1 with Triglyceride G-1, and evaluated in the same manner as in Example 1. The results obtained are shown in Table 1. It is seen that the ink composition exhibits high transmittance, excellent transparency, and excellent adhesion similarly to Example 7.

EXAMPLE 17

A magenta hot-melt ink composition was prepared in the same manner as in Example 12, except for replacing Fatty acid amide F-1 with Triglyceride G-1, and evaluated in the same manner as in Example 1. The results obtained are shown in Table 1. It is seen that the ink composition exhibits high transmittance, excellent transparency, and excellent adhesion similarly to Example 12.

EXAMPLE 18

A magenta hot-melt ink composition was prepared in the same manner as in Example 9, except for changing the amount of Polyamide A-2 to 55.9% and further adding 2.9% of Viscosity depressant, and evaluated in the same manner as in Example 1. The results obtained are shown in Table 1. It is seen that the ink composition exhibits high transmittance, excellent transparency, and excellent adhesion similarly to Example 9. In addition, the resulting ink composition was easier to handle.

COMPARATIVE EXAMPLE 1

A magenta hot-melt ink composition was prepared by mixing 98% of Wax W-1 and 2.0% of Dye M and evaluated in the same manner as in Example 1. The results obtained are shown in Table 1. It is seen from Table 1 that the ink composition has a low transmittance, poor transparency, and lower adhesion than that of Example 1.

COMPARATIVE EXAMPLE 2

A magenta hot-melt ink composition was prepared by mixing 98% of Wax W-2 and 2.0% of Dye M and evaluated in the same manner as in Example 1. The results obtained are shown in Table 1. It is seen from Table 1 that the ink composition has a low transmittance, poor transparency, and lower adhesion than that of Example 1.

COMPARATIVE EXAMPLE 3

A magenta hot-melt ink composition was prepared by mixing 32% of Polyamide A-1, 66% of Wax W-1, and 2.0% of Dye M and evaluated in the same manner as in Example 1. The results obtained are shown in Table 1. It is seen from Table 1 that the ink composition has a low transmittance, poor transparency, and lower adhesion than that of Example 1.

COMPARATIVE EXAMPLE 4

A magenta hot-melt ink composition was prepared by mixing 32% of Fatty acid amide F-1, 66% of Wax W-1, and 2.0% of Dye M and evaluated in the same manner as in Example 1. The results obtained are shown in Table 1. It is seen from Table 1 that the ink composition has a low transmittance, poor transparency, and lower adhesion than that of Example 1.

TABLE 1

| Example No. | Polyamide (wt %) | Viscosity Depressant (wt %) | Fatty Acid Amide (wt %) | Triglyceride (wt %) | Wax (wt %) | Dye (wt %) | Transmittance (%) | Transparency | Adhesion |
|---|---|---|---|---|---|---|---|---|---|
| Example 1 | A-1 (58.8) | | F-1 (19.6) | | W-1 (19.6) | M (2.0) | >80 | good | good |
| Example 2 | A-1 (58.8) | | F-2 (19.6) | | W-1 (19.6) | M (2.0) | >80 | good | good |
| Example 3 | A-1 (58.8) | | F-3 (19.6) | | W-1 (19.6) | M (2.0) | >80 | good | good |
| Example 4 | A-1 (58.8) | | F-3 (19.6) | | W-1 (19.6) | C (2.0) | >80 | good | good |
| Example 5 | A-1 (58.8) | | F-3 (19.6) | | W-1 (19.6) | Y (2.0) | >80 | good | good |
| Example 6 | A-1 (58.8) | | F-3 (19.6) | | W-1 (19.6) | Bk (2.0) | — | — | good |
| Example 7 | A-2 (58.8) | | F-1 (19.6) | | W-1 (19.6) | M (2.0) | >80 | good | good |
| Example 8 | A-2 (58.8) | | F-2 (19.6) | | W-1 (19.6) | M (2.0) | >80 | good | good |
| Example 9 | A-2 (58.8) | | F-3 (19.6) | | W-1 (19.6) | M (2.0) | >80 | good | good |
| Example 10 | A-2 (58.8) | | F-1 (25) | | W-1 (14.2) | M (2.0) | <60 | bad | good |
| Example 11 | A-2 (58.8) | | F-1 (14.2) | | W-1 (25) | M (2.0) | <60 | bad | good |
| Example 12 | A-3 (58.8) | | F-1 (19.6) | | W-1 (19.6) | M (2.0) | >80 | good | good |
| Example 13 | A-3 (58.8) | | F-2 (19.6) | | W-2 (19.6) | M (2.0) | >80 | good | good |
| Example 14 | A-4 (58.8) | | F-3 (19.6) | | W-3 (19.6) | M (2.0) | >80 | good | good |
| Example 15 | A-1 (58.8) | | | G-1 (19.6) | W-1 (19.6) | M (2.0) | >80 | good | good |
| Example 16 | A-2 (58.8) | | | G-1 (19.6) | W-1 (19.6) | M (2.0) | >80 | good | good |
| Example 17 | A-3 (58.8) | | | G-1 (19.6) | W-1 (19.6) | M (2.0) | >80 | good | good |
| Example 18 | A-2 (55.9) | (2.9) | F-3 (19.6) | | W-1 (19.6) | M (2.0) | >80 | good | good |
| Compara. Example 1 | | | | | W-1 (98) | M (2.0) | <50 | bad | bad |
| Compara. Example 2 | | | | | W-2 (98) | M (2.0) | <50 | bad | bad |

TABLE 1-continued

| Example No. | Polyamide (wt %) | Viscosity Depressant (wt %) | Fatty Acid Amide (wt %) | Triglyceride (wt %) | Wax (wt %) | Dye (wt %) | Transmittance (%) | Transparency | Adhesion |
| --- | --- | --- | --- | --- | --- | --- | --- | --- | --- |
| Compara. Example 3 | A-1 (32) | | | | W-1 (66) | M (2.0) | <60 | bad | medium |
| Compara. Example 4 | | | F-1 (32) | | W-1 (66) | M (2.0) | <50 | bad | bad |

The results in Table 1 prove that the ink composition according to the present invention provides an ink image having markedly improved transparency on an OHP sheet without requiring a post treatment, such as leveling with a roller.

EXAMPLE 19

A mixture comprising 50% of Polyamide A-1, 33% of Fatty acid amide F-1, 15% of Fatty acid C-1, and 2.0% of Magenta dye M was heated at 120±10° C. until the mixture turned to a homogeneous molten mixture (for about 2 hours). After removing impurities, etc. by filtration under heat and pressure, the molten mixture was allowed to cool at room temperature to obtain a homogeneous magenta hot-melt ink.

The resulting hot-melt ink was evaluated in the same manner as in Example 1. The results obtained are shown in Table 2 below. It is seen that the ink composition exhibits high transmittance, excellent transparency, and excellent adhesion.

EXAMPLE 20

A magenta hot-melt ink composition was prepared in the same manner as in Example 19, except for replacing Fatty acid amide F-1 with F-2, and evaluated in the same manner as in Example 1. The results obtained are shown in Table 2. It is seen that the ink composition exhibits high transmittance, excellent transparency, and excellent adhesion similar to Example 19.

EXAMPLE 21

A magenta hot-melt ink composition was prepared in the same manner as in Example 19, except for replacing Fatty acid amide F-1 with F-3, and evaluated in the same manner as in Example 1. The results obtained are shown in Table 2. It is seen that the ink composition exhibits high transmittance, excellent transparency, and excellent adhesion similar to Example 19.

EXAMPLE 22

A cyan hot-melt ink composition was prepared in the same manner as in Example 19, except for replacing Fatty acid amide F-1 with F-3 and replacing Dye M with C, and evaluated in the same manner as in Example 1. The results obtained are shown in Table 2 below. It is seen that the ink composition exhibits high transmittance, excellent transparency, and excellent adhesion.

EXAMPLE 23

A yellow hot-melt ink composition was prepared in the same manner as in Example 19, except for replacing Fatty acid amide F-1 with F-3 and replacing Dye M with Y, and evaluated in the same manner as in Example 1. The results obtained are shown in Table 2. It is seen that the ink composition exhibits high transmittance, excellent transparency, and excellent adhesion.

EXAMPLE 24

A black hot-melt ink composition was prepared in the same manner as in Example 19, except for replacing Fatty acid amide F-1 with F-3 and replacing Dye M with Bk, and evaluated in the same manner as in Example 1. The results obtained are shown in Table 2 below. It is seen that the ink composition exhibits high transmittance, excellent transparency, and excellent adhesion.

EXAMPLE 25

A magenta hot-melt ink composition was prepared in the same manner as in Example 19, except for replacing Polyamide A-1 with A-2, and evaluated in the same manner as in Example i. The results obtained are shown in Table 2. It is seen that the ink composition exhibits high transmittance, excellent transparency, and excellent adhesion.

EXAMPLE 26

A magenta hot-melt ink composition was prepared in the same manner as in Example 20, except for replacing Polyamide A-1 with A-2, and evaluated in the same manner as in Example 1. The results obtained are shown in Table 2. It is seen that the ink composition exhibits high transmittance, excellent transparency, and excellent adhesion.

EXAMPLE 27

A magenta hot-melt ink composition was prepared in the same manner as in Example 21, except for replacing Polyamide A-1 with A-2, and evaluated in the same manner as in Example 1. The results obtained are shown in Table 2. It is seen that the ink composition exhibits high transmittance, excellent transparency, and excellent adhesion.

EXAMPLE 28

A magenta hot-melt ink composition was prepared in the same manner as in Example 25, except for changing the amounts of Polyamide A-2, Fatty acid amide F-1, and Fatty acid C-1 to 35%, 40%, and 23%, respectively, and evaluated in the same manner as in Example 1. The results obtained are shown in Table 2. It is seen that the ink composition is inferior in transmittance and transparency to that of Example 25.

EXAMPLE 29

A magenta hot-melt ink composition was prepared in the same manner as in Example 25, except for changing the amounts of Polyamide A-2, Fatty acid amide F-1, and Fatty Acid C-1 to 35%, 23%, and 40%, respectively, and evaluated in the same manner as in Example 1. The results obtained are shown in Table 2. It is seen that the ink composition is inferior in transmittance and transparency to that of Example 25.

EXAMPLE 30

A magenta hot-melt ink composition was prepared in the same manner as in Example 19, except for replacing Polyamide A-1 with A-5, and evaluated in the same manner as in Example 1. The results obtained are shown in Table 2. It is seen that the ink composition exhibits high transmittance, excellent transparency, and excellent adhesion.

EXAMPLE 31

A magenta hot-melt ink composition was prepared in the same manner as in Example 21, except for replacing Polyamide A-1 with A-4, and evaluated in the same manner as in Example 1. The results obtained are shown in Table 2. It is seen that the ink composition exhibits high transmittance, excellent transparency, and excellent adhesion.

EXAMPLE 32

A magenta hot-melt ink composition was prepared in the same manner as in Example 27, except for changing the amount of Polyamide A-2 to 47% and further adding 3% of Viscosity depressant, and evaluated in the same manner as in Example 1. The results obtained are shown in Table 2. It is seen that the ink composition exhibits high transmittance, excellent transparency, and excellent adhesion.

COMPARATIVE EXAMPLE 5

A magenta hot-melt ink composition was prepared from 98% of Fatty acid C-1 and 2.0% of Dye M and evaluated in the same manner as in Example 1. The results obtained are shown in Table 2. It is seen that the composition has a lower transmittance, poorer transparency, and lower adhesion than that of Example 19.

COMPARATIVE EXAMPLE 6

A magenta hot-melt ink composition was prepared from 32% of Polyamide A-1, 66% of Fatty acid amide F-1, and 2.0% of Dye M and evaluated in the same manner as in Example 1. The results obtained are shown in Table 2. It is seen that the composition has a lower transmittance, poorer transparency, and lower adhesion than that of Example 19.

COMPARATIVE EXAMPLE 7

A magenta hot-melt ink composition was prepared from 32% of Polyamide A-1, 66% of Fatty acid C-1, and 2.0% of Dye M and evaluated in the same manner as in Example 1. The results obtained are shown in Table 2. It is seen that the composition has a lower transmittance, poorer transparency, and lower adhesion than that of Example 19.

COMPARATIVE EXAMPLE 8

A magenta hot-melt ink composition was prepared from 32% of Fatty acid amide F-1, 66% of Fatty acid C-1, and 2.0% of Dye M and evaluated in the same manner as in Example 1. The results obtained are shown in Table 2. It is seen that the composition has a lower transmittance, poorer transparency, and lower adhesion than that of Example 19.

TABLE 2

| Example No. | Polyamide (wt %) | Viscosity Depressant (wt %) | Fatty Acid Amide (wt %) | Fatty Acid (wt %) | Dye (wt %) | Transmittance (%) | Transparency | Adhesion |
| --- | --- | --- | --- | --- | --- | --- | --- | --- |
| Example 19 | A-1 (50) | | F-1 (33) | C-1 (15) | M (2.0) | >80 | good | good |
| Example 20 | A-1 (50) | | F-2 (33) | C-1 (15) | M (2.0) | >80 | good | good |
| Example 21 | A-1 (50) | | F-3 (33) | C-1 (15) | M (2.0) | >80 | good | good |
| Example 22 | A-1 (50) | | F-3 (33) | C-1 (15) | C (2.0) | >80 | good | good |
| Example 23 | A-1 (50) | | F-3 (33) | C-1 (15) | Y (2.0) | >80 | good | good |
| Example 24 | A-1 (50) | | F-3 (33) | C-1 (15) | Bk (2.0) | — | — | good |
| Example 25 | A-2 (50) | | F-1 (33) | C-1 (15) | M (2.0) | >80 | good | good |
| Example 26 | A-2 (50) | | F-2 (33) | C-1 (15) | M (2.0) | >80 | good | good |
| Example 27 | A-2 (50) | | F-3 (33) | C-1 (15) | M (2.0) | >80 | good | good |
| Example 28 | A-2 (35) | | F-1 (40) | C-1 (23) | M (2.0) | <60 | bad | good |
| Example 29 | A-2 (35) | | F-1 (23) | C-1 (40) | M (2.0) | <60 | bad | good |
| Example 30 | A-5 (50) | | F-1 (33) | C-1 (15) | M (2.0) | >80 | good | good |
| Example 31 | A-4 (50) | | F-3 (33) | C-1 (15) | M (2.0) | >80 | good | good |
| Example 32 | A-2 (47) | (3) | F-3 (33) | C-1 (15) | M (2.0) | >80 | good | good |
| Compara. Example 5 | | | | C-1 (98) | M (2.0) | <50 | bad | bad |
| Compara. Example 6 | A-1 (32) | | F-1 (66) | | M (2.0) | <50 | bad | medium |
| Compara. Example 7 | A-1 (32) | | | C-1 (66) | M (2.0) | <50 | bad | medium |

TABLE 2-continued

| Example No. | Polyamide (wt %) | Viscosity Depressant (wt %) | Fatty Acid Amide (wt %) | Fatty Acid (wt %) | Dye (wt %) | Transmittance (%) | Transparency | Adhesion |
| --- | --- | --- | --- | --- | --- | --- | --- | --- |
| 7 Compara. Example 8 | | | F-1 (32) | C-1 (66) | M (2.0) | <50 | bad | bad |

The results in Table 2 prove that the ink composition according to the present invention provides a ink image having markedly improved transparency on an OHP sheet without requiring a post treatment, such as leveling with a roller.

EXAMPLE 33

A mixture comprising 50% of Polyamide A-1, 33% of Fatty acid amide F-4 as a viscosity depressant, 15% of Glyceride G-2, and 2.0% of Dye M was heated at 120±10° C. until the mixture turned to a homogeneous molten mixture (for about 2 hours). After removing impurities, etc. by filtration under heat and pressure, the molten mixture was allowed to cool at room temperature to obtain a homogeneous magenta hot-melt ink.

The resulting hot-melt ink was evaluated in the same manner as in Example 1, except for using as an OHP sheet "COPY THROUGH FM 27 TR" produced by Sterusu Kenkyusho. The results obtained are shown in Table 3 below. It is seen from Table 3 that the ink composition exhibits high transmittance, excellent transparency, and excellent adhesion.

EXAMPLE 34

A magenta hot-melt ink composition was prepared in the same manner as in Example 33, except for replacing Glyceride G-2 with G-3, and evaluated in the same manner as in Example 33. The results obtained in Table 3. It is seen that the ink composition exhibits high transmittance, excellent transparency, and excellent adhesion.

EXAMPLE 35

A magenta hot-melt ink composition was prepared in the same manner as in Example 33, except for replacing Glyceride G-2 with G-4, and evaluated in the same manner as in Example 33. The results obtained in Table 3. It is seen that the ink composition exhibits high transmittance, excellent transparency, and excellent adhesion.

EXAMPLE 36

A magenta hot-melt ink composition was prepared in the same manner as in Example 33, except for replacing Fatty acid amide F-4 with F-5, and evaluated in the same manner as in Example 33. The results obtained in Table 3. It is seen that the ink composition exhibits high transmittance, excellent transparency, and excellent adhesion.

EXAMPLE 37

A cyan hot-melt ink composition was prepared in the same manner as in Example 33, except for replacing Dye M with C, and evaluated in the same manner as in Example 33. The results obtained in Table 3. It is seen that the ink composition exhibits high transmittance, excellent transparency, and excellent adhesion.

EXAMPLE 38

A yellow hot-melt ink composition was prepared in the same manner as in Example 33, except for replacing Dye M with Y, and evaluated in the same manner as in Example 33. The results obtained in Table 3. It is seen that the ink composition exhibits high transmittance, excellent transparency, and excellent adhesion.

EXAMPLE 39

A black hot-melt ink composition was prepared in the same manner as in Example 33, except for replacing Dye M with Bk, and evaluated in the same manner as in Example 33. The results obtained in Table 3. It is seen that the ink composition exhibits high transmittance, excellent transparency, and excellent adhesion.

EXAMPLE 40

A magenta hot-melt ink composition was prepared in the same manner as in Example 33, except for replacing Polyamide A-1 with A-4, and evaluated in the same manner as in Example 33. The results obtained in Table 3. It is seen that the ink composition exhibits high transmittance, excellent transparency, and excellent adhesion.

EXAMPLE 41

A magenta hot-melt ink composition was prepared in the same manner as in Example 33, except for changing the amounts of Polyamide A-1, Fatty acid amide F-4, and Glyceride G-2 to 35%, 40%, an 23%, respectively, and evaluated in the same manner as in Example 33. The results obtained in Table 3. It is seen that the ink composition exhibits high transmittance, excellent transparency, and excellent adhesion.

EXAMPLE 42

A magenta hot-melt ink composition was prepared in the same manner as in Example 33, except for changing the amounts of Polyamide A-1, Fatty acid amide F-4, and Glyceride G-2 to 20%, 38%, and 40%, respectively, and evaluated in the same manner as in Example 33. The results obtained in Table 3. It is seen that the ink composition exhibits high transmittance, excellent transparency, and excellent adhesion.

EXAMPLE 43

A magenta hot-melt ink composition was prepared in the same manner as in Example 35, except for replacing Polyamide A-1 with 20% of A-4 and changing the amounts of Fatty acid amide F-4 and Glyceride G-4 to 58% and 20%, respectively, and evaluated in the same manner as in Example 33. The results obtained in Table 3. It is seen that the ink composition exhibits high transmittance, excellent transparency, and excellent adhesion similarly to Example 33.

COMPARATIVE EXAMPLE 9

A magenta hot-melt ink composition was prepared in the same manner as in Example 33, except for using 20% of Polyamide A-1, 68% of Fatty acid Amide F-4, and 10% of Glyceride G-2, and evaluated in the same manner as in Example 33. The results obtained in Table 3. It is seen that the ink composition has a lower transmittance, poorer transparency, and poorer adhesion than that of Example 33.

COMPARATIVE EXAMPLE 10

A magenta hot-melt ink composition was prepared in the same manner as in Example 33, except for using 20% of Polyamide A-1, 30% of Fatty acid Amide F-4, and 48% of Glyceride G-2, and evaluated in the same manner as in Example 33. The results obtained in Table 3. It is seen that the ink composition has a lower transmittance, poorer transparency, and poorer adhesion than that of Example 33.

COMPARATIVE EXAMPLE 11

A magenta hot-melt ink composition was prepared in the same manner as in Example 33, except for using 8% of Polyamide A-1, 60% of Fatty acid Amide F-4, and 30% of Glyceride G-2, and evaluated in the same manner as in Example 33. The results obtained in Table 3. It is seen that the ink composition has a lower transmittance, poorer transparency, and poorer adhesion than that of Example 33.

TABLE 3

| Example No. | Polyamide (wt %) | Fatty Acid Amide (wt %) | Glyceride (wt %) | Dye (wt %) | Transmittance (%) | Transparency | Adhesion |
|---|---|---|---|---|---|---|---|
| Example 33 | A-1 (50) | F-4 (33) | G-2 (15) | M (2) | >80 | good | good |
| Example 34 | A-1 (50) | F-4 (33) | G-3 (15) | M (2) | >80 | good | good |
| Example 35 | A-1 (50) | F-4 (33) | G-4 (15) | M (2) | >80 | good | good |
| Example 36 | A-1 (50) | F-5 (33) | G-2 (15) | M (2) | >80 | good | good |
| Example 37 | A-1 (50) | F-4 (33) | G-2 (15) | C (2) | >80 | good | good |
| Example 38 | A-1 (50) | F-4 (33) | G-2 (15) | Y (2) | >80 | good | good |
| Example 39 | A-1 (50) | F-4 (33) | G-2 (15) | Bk (2) | — | — | good |
| Example 40 | A-4 (50) | F-4 (33) | G-2 (15) | M (2) | >80 | good | good |
| Example 41 | A-1 (35) | F-4 (40) | G-2 (23) | M (2) | >80 | good | good |
| Example 42 | A-1 (20) | F-4 (38) | G-2 (40) | M (2) | >80 | good | good |
| Example 43 | A-4 (20) | F-4 (58) | G-4 (20) | M (2) | >80 | good | good |
| Compara. Example 9 | A-1 (20) | F-4 (68) | G-2 (10) | M (2) | >50 | bad | medium |
| Compara. Example 10 | A-1 (20) | F-4 (30) | G-2 (48) | M (2) | >50 | bad | medium |
| Compara. Example 11 | A-1 (8) | F-4 (60) | G-2 (30) | M (2) | >50 | bad | bad |

The results in Table 3 prove that the ink composition according to the present invention provides a ink image having markedly improved transparency on an OHP sheet without requiring a post treatment, such as leveling with a roller.

While the invention has been described in detail and with reference to specific examples thereof, it will be apparent to one skilled in the art that various changes and modifications can be made therein without departing from the spirit and scope thereof.

What is claimed is:

1. A hot-melt ink composition which is solid at room temperature and is liquefied by heating, comprising from 10 to 65% by weight of a polyamide resin, and from 5 to 40% by weight of a glyceride.

2. A hot-melt ink composition as claimed in claim 1, wherein said polyamide resin is present in an amount of from 10 to 20% by weight.

3. A hot-melt ink composition as claimed in claim 2, wherein said polyamide resin is present in an amount of 10% by weight.

4. A hot-melt ink composition as claimed in claim 1, further comprising a fatty acid amide, said fatty acid amide being present in said composition in an amount of from 5 to 60% by weight.

5. A hot-melt ink composition as claimed in claim 4, wherein said fatty acid amide is present in an amount of from 40 to 60% by weight.

6. A hot-melt ink composition as claimed in claim 5, wherein said fatty acid amide is present in an amount of 50% by weight.

7. A hot-melt ink composition as claimed in claim 1, wherein said glyceride is present in an amount of from 10 to 40% by weight 8. A hot-melt ink composition as claimed in claim 7, wherein said glyceride is present in an amount of 10% by weight.

9. A hot-melt ink composition as claimed in claim 1, further comprising a colorant.

10. A hot-melt ink composition as claimed in claim 9, wherein said colorant is present in an amount of from 0.5 to 5% by weight.

11. A hot-melt ink composition as claimed in claim 9, wherein said colorant has a magenta color, a cyan color, a yellow color, or a black color.

12. A hot-melt ink composition as claimed in claim 1, wherein said ink composition is for an ink jet printer.

13. A hot-melt ink composition as claimed in claim 4, wherein said fatty acid amide is selected from the group consisting of an N-unsubstituted fatty acid amide, an N-substituted fatty acid amide and mixtures thereof.

14. A hot-melt ink composition as claimed in claim 13, wherein said N-unsubstituted fatty acid amide is selected from the group consisting of lauramide, stearamide, oleamide, erucamide, ricinoleic acid amide, 1,2-hydroxystearamide, palmitamide, behenamide, brassidamide and mixtures thereof.

15. A hot-melt ink composition as claimed in claim 13, wherein said N-substituted fatty acid amide is selected from the group consisting of N,N'-ethylenebisoleic acid amide, N,N'-xylenebisstearic acid amide, stearic acid monomethylolamide, N-oleylstearic acid amide, N-stearylstearic acid amide, N-oleylpalmitic acid amide, N-stearylerucic acid amide, N,N'-dioleyladipic acid amide, N,N'-dioleylsebacic acid amide, N,N'-distearylisophthalic acid amide and mixtures thereof.

16. A hot-melt ink composition as claimed in claim 1, wherein said glyceride is selected from the group consisting of triglyceride, hardened castor oil, partially hydrogenated castor oil, hardened soybean oil, hardened rape seed oil, hardened vegetable oil and mixtures thereof.

17. A hot-melt ink composition which is solid at room temperature and is liquefied by heating, comprising from 10 to 65% by weight of a polyamide resin, from 5 to 40% by weight of a glyceride, and a colorant in an amount up to 5% by weight.

18. A hot-melt ink composition as claimed in claim 17, wherein said polyamide resin is present in an amount of from 10 to 20% by weight.

19. A hot-melt ink composition as claimed in claim 18, wherein said polyamide resin is present in an amount of 10% by weight.

20. A hot-melt ink composition as claimed in claim 17, further comprising a fatty acid amide, said fatty acid amide being present in said composition in an amount of from 5 to 60% by weight.

21. A hot-melt ink composition as claimed in claim 20, wherein said fatty acid amide is present in an amount of from 40 to 60% by weight.

22. A hot-melt ink composition as claimed in claim 21, wherein said fatty acid amide is present in an amount of 50% by weight.

23. A hot-melt ink composition as claimed in claim 17, wherein said glyceride is present in an amount of from 10 to 40% by weight.

24. A hot-melt ink composition as claimed in claim 23, wherein said glyceride is present in an amount of 10% by weight.

25. A hot-melt ink composition as claimed in claim 17, wherein said colorant has a magenta color, a cyan color, a yellow color, or a black color.

26. A hot-melt ink composition as claimed in claim 17, wherein said ink composition is for an ink jet printer.

27. A hot-melt ink composition comprising from 25 to 65% by weight of a polyamide resin, from 10 to 60% by weight of a fatty acid amide, up to 40% by weight of a fatty acid and from 0.5 to 5% by weight of a colorant.

28. A hot-melt ink composition comprising from 10 to 50% by weight of a polyamide resin, from 20 to 60% by weight of a fatty acid amide, from 10 to 40% by weight of a glyceride, and from 0.5 to 5% by weight of a colorant.

29. A hot-melt ink composition which is solid at room temperature and is liquefied by heating, comprising from 10 to 20% by weight of a polyamide resin, from 40 to 60% by weight of a saturated fatty acid amide and from 10 to 20% by weight of a glyceride.

* * * * *